United States Patent
Lee

(10) Patent No.: US 8,894,071 B2
(45) Date of Patent: Nov. 25, 2014

(54) O-RING FOR FEED ROLLER

(76) Inventor: Byung-chil Lee, Cheonan (KR)

(*) Notice: Subject to any disclaimer, the term of this patent is extended or adjusted under 35 U.S.C. 154(b) by 645 days.

(21) Appl. No.: 13/129,558

(22) PCT Filed: Jun. 22, 2010

(86) PCT No.: PCT/KR2010/004016
§ 371 (c)(1),
(2), (4) Date: May 16, 2011

(87) PCT Pub. No.: WO2011/152586
PCT Pub. Date: Dec. 8, 2011

(65) Prior Publication Data
US 2012/0091669 A1  Apr. 19, 2012

(30) Foreign Application Priority Data
Jun. 3, 2010 (KR) .................. 10-2010-0052400

(51) Int. Cl.
*F16J 15/00* (2006.01)
*F16J 3/00* (2006.01)
*F16J 15/32* (2006.01)
*B65G 39/07* (2006.01)

(52) U.S. Cl.
CPC ............. *F16J 15/3272* (2013.01); *B65G 39/07* (2013.01)
USPC ......................................... 277/546; 277/631

(58) Field of Classification Search
USPC ................. 277/494, 495, 546, 547, 548, 631; 403/393, 364, 339, 340
See application file for complete search history.

(56) References Cited

U.S. PATENT DOCUMENTS

| | | | | | |
|---|---|---|---|---|---|
| 1,171,199 | A | * | 2/1916 | Hicks ............................ | 277/494 |
| 1,546,622 | A | * | 7/1925 | Cook ............................ | 277/495 |
| 2,346,899 | A | * | 4/1944 | Bowers ........................ | 277/463 |
| 3,124,502 | A | * | 3/1964 | Radke .......................... | 428/66.4 |
| 3,601,436 | A | * | 8/1971 | Jorgensen .................... | 220/200 |
| 5,651,225 | A | * | 7/1997 | Leeks ........................... | 52/461 |
| 7,993,719 | B2 | * | 8/2011 | Stanton ........................ | 428/57 |
| 8,490,359 | B2 | * | 7/2013 | Perotti et al. ................ | 52/589.1 |
| 2006/0038355 | A1 | * | 2/2006 | Nakaoka et al. ............. | 277/495 |
| 2008/0277882 | A1 | | 11/2008 | Kyohei et al. | |
| 2009/0051126 | A1 | * | 2/2009 | King et al. ................... | 277/631 |

FOREIGN PATENT DOCUMENTS

JP  2003-028308 A  1/2003

* cited by examiner

*Primary Examiner* — Kristina Fulton
*Assistant Examiner* — L. Susmitha Koneru
(74) *Attorney, Agent, or Firm* — Edwards Wildman Palmer LLP; Kongsik Kim

(57) ABSTRACT

An O-ring for a feed roller includes an O-ring body having first and second ends, which are discontinued from each other, wherein coupling surfaces in the first and second ends are capable of being coupled to each other while opposing each other in a complementary fashion; and a fastening unit fastening the first and second ends to each other such that the coupling surfaces in the first and second ends form and maintain a coupled state in which coupling surfaces oppose each other in a complementary fashion. The O-ring body has first and second storage recesses formed in corresponding opposite positions, the first and second storage recesses being engraved on outer circumferential surfaces thereof, and the fastening unit is received in and fitted to the first and second storage recesses.

5 Claims, 14 Drawing Sheets

O-RING FOR FEED ROLLER

CROSS-REFERENCES TO RELATED APPLICATIONS

This application is a U.S. national phase application, pursuant to 35 U.S.C. §371, of PCT/KR2010/004016, filed Jun. 22, 2010, designating the United States, which claims priority to Korean Application No. 10-2010-0052400, filed Jun. 3, 2010. The entire contents of the aforementioned patent applications are incorporated herein by this reference.

TECHNICAL FIELD

The present invention relates to an O-ring for a feed roller, and more particularly, to an O-ring which is used in a feed roller which conveys a substrate that can prevent the substrate from slipping so that the substrate is carried properly.

BACKGROUND ART

A substrate is applied to a variety of products, for example, a flat display device such as a Liquid Crystal Device (LCD) or a Plasma Display Device (PDP).

The substrate, which is used in a variety of devices such as the above, is a final product resulting from a variety of semiconductor processes, and is carried by feed rollers so that it can be subjected to respective semiconductor processes.

An example of the feed rollers are feed rollers that carry the substrate, which include upper and lower rows of feed rollers, and which are configured such that they can rotate while facing each other. The shaft of the upper feed roller and the shaft of the lower feed roller are connected to each other such that they can be simultaneously driven and rotated, so that the substrate can be carried therebetween.

Each of the upper and lower feed rollers is provided with an O-ring made of a rubber material and a resin material. The O-ring prevents slipping by providing a frictional force when the substrate is carried so that the substrate can be properly carried without being damaged.

The O-ring has the form of a closed loop, and each feed roller is provided with a plurality of such O-rings, which are coupled to the feed roller at regular intervals. Since the O-rings, which are disposed like above, serve to repeatedly carry substrates for a long time, they become worn because of their contact with the substrates and come to have irregular sizes. In addition, since contact and abrasion decrease the frictional force, it becomes difficult to properly carry the substrates.

Therefore, an O-ring must be replaced with a new one after it has been used for a predetermined time or becomes damaged.

However, since the above-described O-ring of the related art is in the form of a closed loop, cumbersome operations are required in order to assemble a new O-ring to the feed roller. Specifically, various devices and components connected to one shaft of the feed roller need to be disassembled therefrom, and the new O-ring is assembled to the separated feed roller by fitting it through one end of the feed roller. Consequently, the replacement of an existing O-ring with a new one takes a long time, and the operation is inefficient because of cumbersomeness. In addition, during the replacement operation, the conveyor system must be stopped and the production of substrates is stopped. This, consequently, becomes a cause of a decrease in productivity.

In addition, there are inconveniences in that the disassembled components and devices must be re-fastened to be reassembled, and the coupling position and fastened state of the upper and lower feed rollers are checked and set again, after the O-ring has been replaced.

Furthermore, the O-ring used in the feed roller may have a circular or non-circular (e.g., quadrangular) cross-section, and an O-ring fastening recess (e.g., an annular recess) is formed such that it corresponds to the cross-section of the O-ring used in the feed roller. Therefore, there is a problem in that, in the event of replacing an existing O-ring with a new one, only an O-ring having a shape corresponding to the O-ring fastening recess formed in the feed roller can be used. For example, an O-ring having a circular cross-section only has a small area that is in contact with the substrate. In contrast, a large area of an O-ring having a non-circular cross-section (e.g. a quadrangular cross-section) makes contact with the substrate, thereby conveying the substrate more stably. Accordingly, there is a problem in that the feed roller must be replaced with a new one when replacing an existing O-ring having a circular cross-section with an O-ring having a non-circular cross-section.

Technical Problem

Accordingly, the present invention has been made keeping in mind the above problems occurring in the related art, and is intended to provide an O-ring for a feed roller, which has an improved structure such that the O-ring used in the feed roller can be easily mounted.

Further, the present invention is intended to provide an O-ring for a feed roller, which has an improved structure such that it can replace an existing O-ring having a circular cross-section and it has an increased area that is in contact with the substrate.

Technical Solution

In an aspect, the O-ring for a feed roller of the present invention includes an O-ring body having first and second ends, which are discontinued from each other, wherein coupling surfaces in the first and second ends are capable of being coupled to each other while opposing each other in a complementary fashion; and a fastening unit fastening the first and second ends to each other such that the coupling surfaces in the first and second ends form and maintain a coupled state in which coupling surfaces oppose each other in a complementary fashion. The O-ring body has first and second storage recesses formed in corresponding opposite positions, the first and second storage recesses being engraved on outer circumferential surfaces thereof, and the fastening unit is received in and fitted to the first and second storage recesses.

Here, it is preferred that the O-ring body have a plurality of coupling holes in the first and second ends thereof, the coupling holes penetrating portions of the first and second ends that correspond to the first and second storage recesses. The fastening unit may include first and second fastening members. Each of the first and second fastening members is fitted by being received in a corresponding one of the first and second storage recesses, and the first and second fastening members pass through the coupling holes and are locked to each other in a complementary fashion.

Further, the first fastening member may include a first body received in and fitted to the first storage recess, the first body having a plurality of first locking holes formed in positions corresponding to a portion of the coupling holes; and a plurality of first penetrating pins protruding from the first body. The first penetrating pins pass through a remaining portion of the coupling holes and protrude to an opposite side. The second fastening member may include a second body received in and fitted to the second storage recess, the second body having plurality of second locking holes to which at least one of the first penetrating pins is locked; and a plurality of second penetrating pins protruding from the second body. At least one of the second penetrating pins passes through the coupling holes and is locked to the first locking holes formed in the first body.

Further, the coupling holes may be six coupling holes formed at regular intervals, at least two of the coupling holes being formed in overlapping portions of the first and second ends.

Further, the O-ring body may have a quadrangular cross-section. The coupling surfaces of the first and second ends, which are coupled to each other in a complementary fashion, may be stepped like stairs on an outer circumference and be linearly formed on a side surface.

Further, the O-ring body may have a circular cross-section. The first and second fastening members may be coupled to each other on both sides of the first and second ends in a state in which each of the first and second fastening members is received in a corresponding one of the first and second storage recesses, and have an arc-like outer surface corresponding to an outer circumference of the O-ring body having a circular cross-section.

Further, the O-ring body may include: a contact portion having a quadrangular cross-section, the contact portion protruding outwards and coming into contact with a substrate to be carried when the O-ring is fitted to the feed roller; and a coupling portion protruding from an inner circumference of the contact portion in a circumferential direction. The coupling portion may have an arc-like cross-section, and may be fitted to an O-ring fastening recess of the feed roller, which is engraved in a shape of an arc, when the O-ring is fitted to the feed roller. The first and second storage recesses may be formed in both outer surfaces of the contact such that both the first and second storage recesses correspond to each other. The fastening unit may be coupled to the contact portion by being fitted to the first and second storage recesses.

Advantageous Effects

According to the O-ring for a feed roller of the present invention, the O-ring can be mounted on the feed roller by connecting and coupling the discontinuing portions of the O-ring body to each other using the fastening unit.

Consequently, it is possible to easily replace an existing O-ring with a new one by mounting it on the substrate feed roller such that it surrounds the outer circumference of the feed roller without disassembling the components or devices, which are coupled to one part of the substrate feed roller.

This, consequently, can reduce the time required to replace the O-ring, and simplify the replacing operation, thereby reducing costs. In addition, this can minimize the time for which plant operations must be stopped so that the replacement operation can be carried out, thereby increasing the productivity of making products.

Furthermore, since it is not necessary to disassemble the various components and devices, which are coupled to the feed roller, the assembly error that would otherwise occur during reassembly subsequent to disassembly, can be ultimately excluded. Accordingly, there are advantages in that the setting operation related to the reassembly operation is not necessary, and in that it is possible to prevent a malfunction or a decrease in productivity, which the assembly error otherwise would cause.

BEST MODE

An O-ring for a feed roller of the present invention will now be described more fully hereinafter with reference to the accompanying drawings, in which embodiments thereof are shown.

Figure 1:
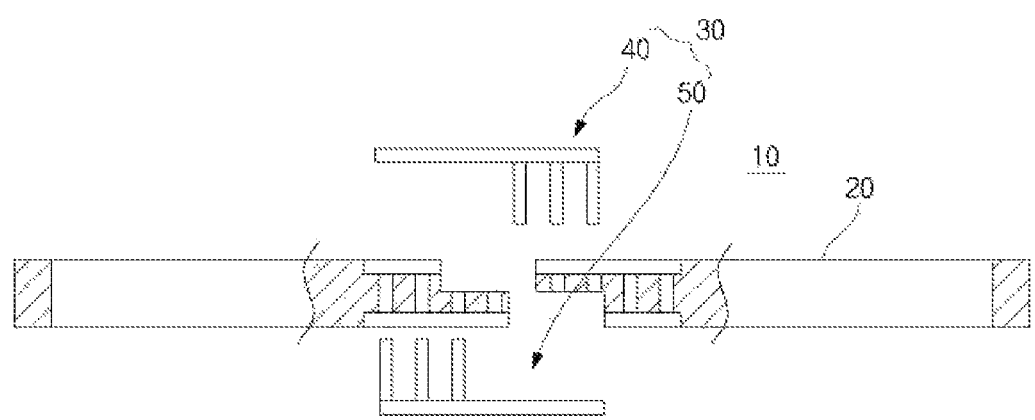
FIG. 1 is a partial cross-sectional view showing an O-ring for a feed roller according to a first embodiment of the invention.
Figure 2:
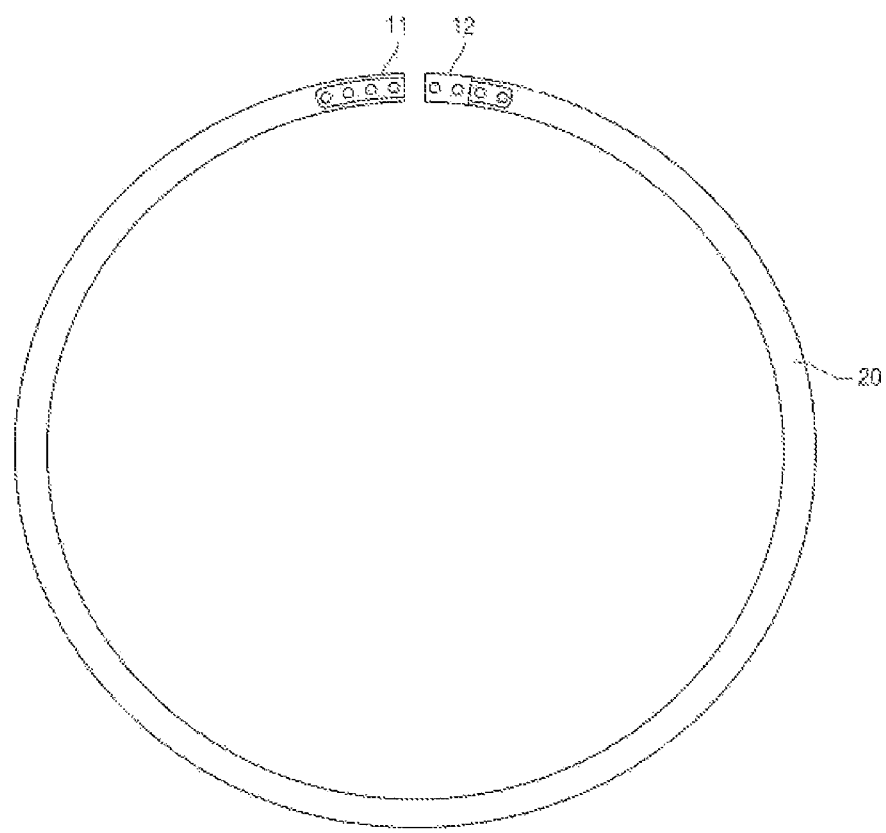
FIG. 2 is a front elevation view of the O-ring for a feed roller shown in FIG. 1.
Figure 3:
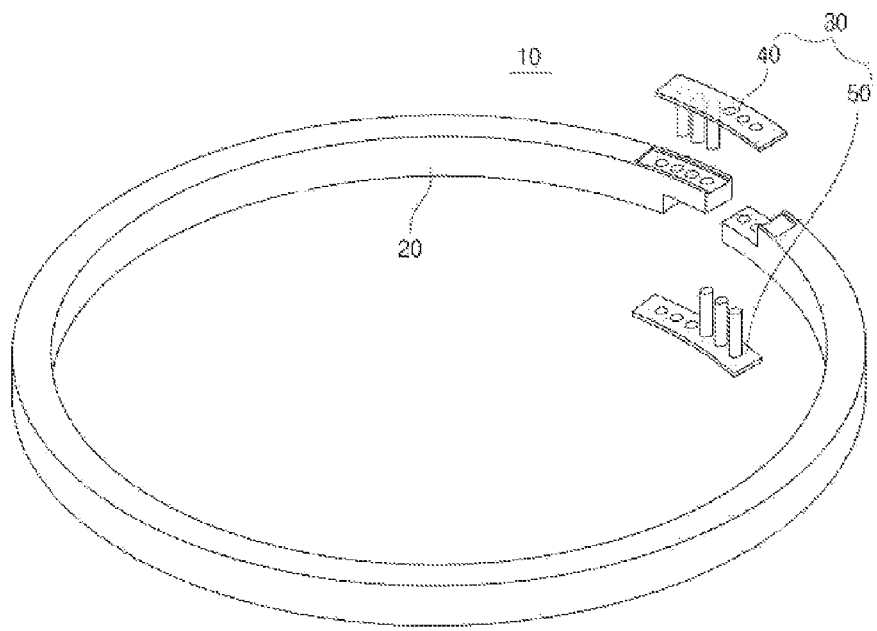
FIG. 3 is an exploded perspective view of the O-ring for a feed roller shown in FIG. 1.

Referring to FIGS. 1, 2, and 3, an O-ring 10 for a feed roller according to a first embodiment of the invention includes an O-ring body 20 and a fastening unit 30 for connecting separated first and second ends 11 and 12 of the O-ring body 20 to each other.

The O-ring body 20 is coupled to the outer circumference of a substrate feed roller, which is not shown, such that it protrudes therefrom. The O-ring body 20 has the form of ring, with one portion thereof being discontinued. The O-ring body 20 has a predetermined width and a predetermined thickness, and has a quadrangular cross-section.

The coupling sections of the first and second ends 11 and 12 of the O-ring body 20, which are separated from each other, are configured such that they are stepped in the plan view, as shown in FIG. 1, and are vertically linear in the front elevation view, as shown in FIG. 2.

The O-ring body 20 is made of a rubber material, such as Karlez®, PTFE, or Teflon.

In addition, first and second recesses 13 and 14 for receiving the fastening unit 30 are formed on both surfaces of the first and second ends 11 and 12 of the O-ring body 20.

Figure 5:
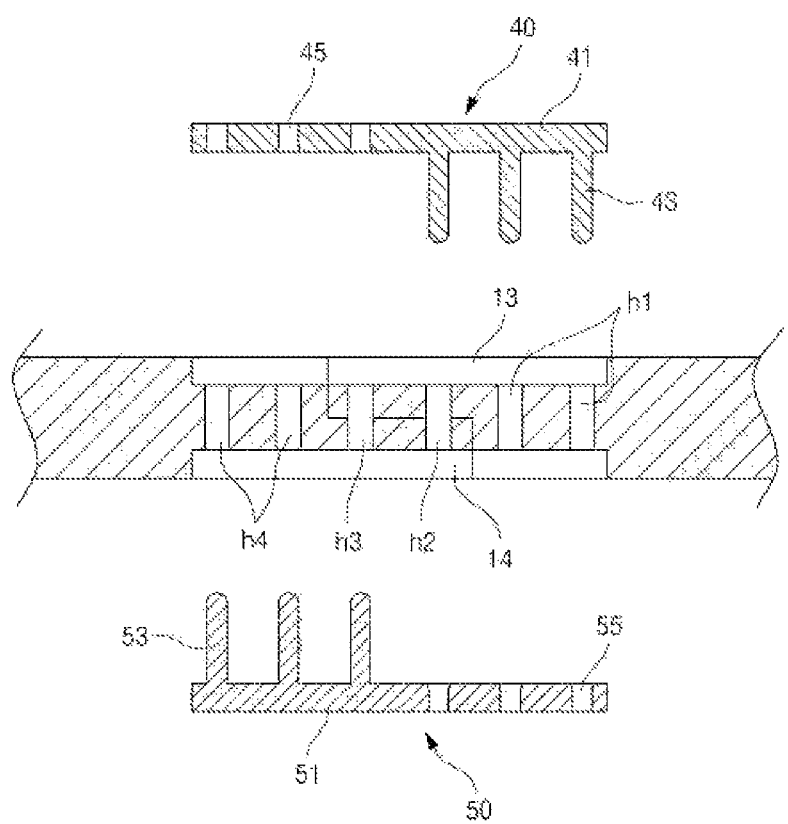
FIG. 5 is a view showing the process of assembling the first and second ends of the body of the O-ring shown in FIG. 1.

In addition, referring to FIG. 5, a plurality of fastening holes h1, h2, h3, and h4 are formed in each of the first and second ends 11 and 12 of the O-ring body 20. The fastening holes h1, h2, h3, and h4 are formed such that they are spaced apart from each other at regular intervals. Specifically, 4 fastening holes are formed in the first end 11, and 4 fastening holes are formed in the second end 12. Two (2) fastening holes h2 and h3 of the fastening holes h1, h2, h3, and h4 in the first and second ends 11 and 12 are formed in the portions that overlap each other when they are coupled. Thus, the 2 fastening holes h2 and h3 can be formed in opposite positions.

The fastening unit 30 serves to fasten the first and second ends 11 and 12 to each other, so that the coupling surfaces of the first and second ends 11 and 12 can be coupled to each other while opposing each other in a complementary fashion, and maintain the coupled state without being separated from each other.

The fastening unit 30 includes a first fastening member 40 and a second fastening member 50.

The first and second fastening members 40 and 50 are symmetrically configured on both sides of the O-ring body 20, i.e. have the same structure and shape. The first and second fastening members 40 and 50 are coupled to each other in one-touch type on both sides of the first and second ends 11 and 12.

Figure 4:
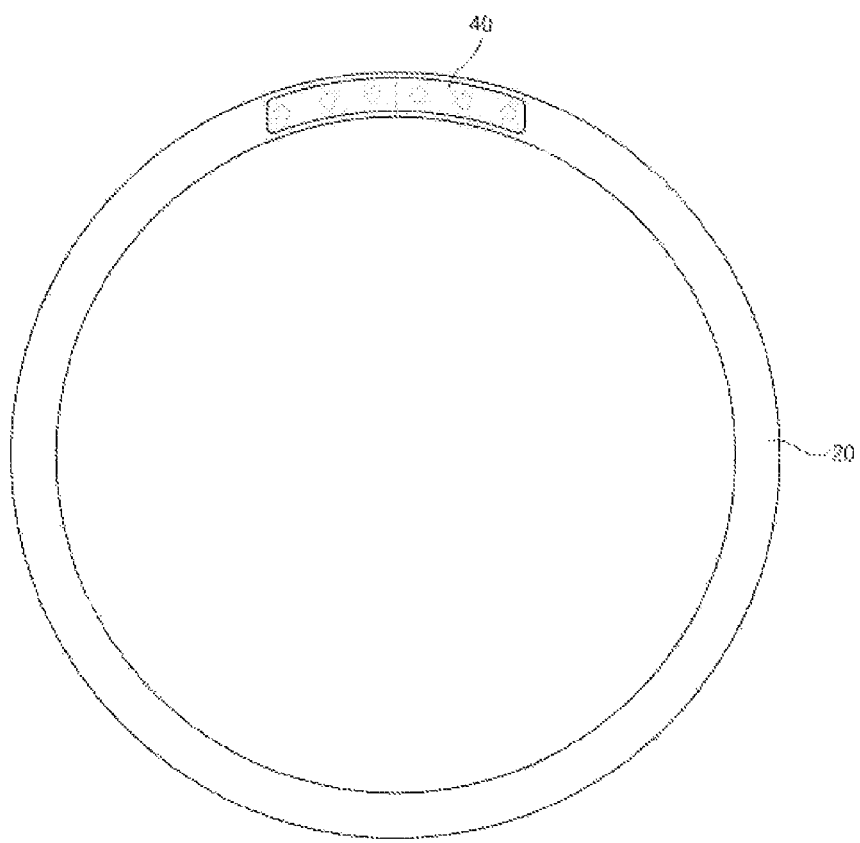
FIG. 4 is a front elevation view showing the state in which the O-ring for a feed roller shown in FIG. 1 is coupled.
Figure 6:
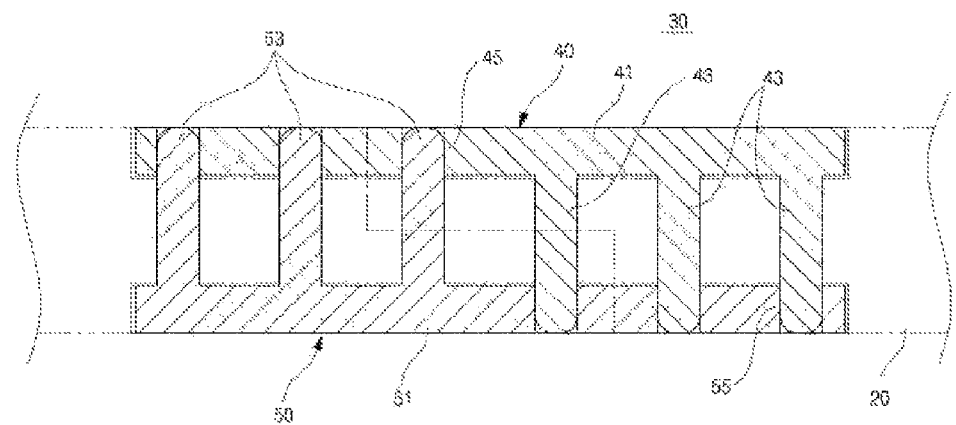
FIG. 6 is partial cross-sectional view showing the state in which the first and second ends of the O-ring shown in FIG. 1 are connected to each other by fastening them using a fastening unit.

Specifically, as shown in FIGS. 4, 5, and 6, the first fastening member 40 includes a first body 41, a plurality of first penetrating pins 43, which is connected to and protrudes from one surface of the first body 41, the first penetrating pins 43 being spaced apart from each other at regular intervals, and a plurality of first locking holes 45.

The second fastening member 50 includes a second body 51, a plurality of second penetrating pins 53, which is connected to and protrudes from one surface of the second body 51, the second penetrating pins 53 being spaced apart from each other at regular intervals, and a plurality of second locking holes 55.

The first body 41 is seated in the first storage recess 13, which is engraved into one side of the O-ring body 20. When the fist body 41 is seated in the first storage recess 13, the first penetrating pins 43 pass through the through-holes h1 and h2 formed in the first and second ends 11 and 12, and are locked to the second locking holes 55 in the second fastening member 50.

In addition, the second body 51 is seated in the second storage recess 14, which is engraved into the other side of the O-ring body 20. When the second body 51 is seated in the second storage recess 14, the second penetrating pins 53 pass through the through-holes h3 and h4 formed in the first and second ends 11 and 12, and are locked to the second locking holes 45 in the first fastening member 40.

Consequently, as shown in FIG. 6, in the state in which the first and second ends 11 and 12 are connected in close contact with each other, the first and second fastening members 40 and 50 are locked to each other, so that the first and second ends 11 and 12 are stably coupled without being separated from each other.

Here, it is preferred that the first and second bodies 41 and 51 have a predetermined width and a predetermined thickness corresponding to those of the storage recesses 13 and 14, be formed to correspond to the arc of the O-ring body 20, that is, along an arc corresponding to the curvature of the arc of the O-ring body 20. It is also preferred that the storage recesses 13 and 14 be formed to have the same curvature.

Figure 7:
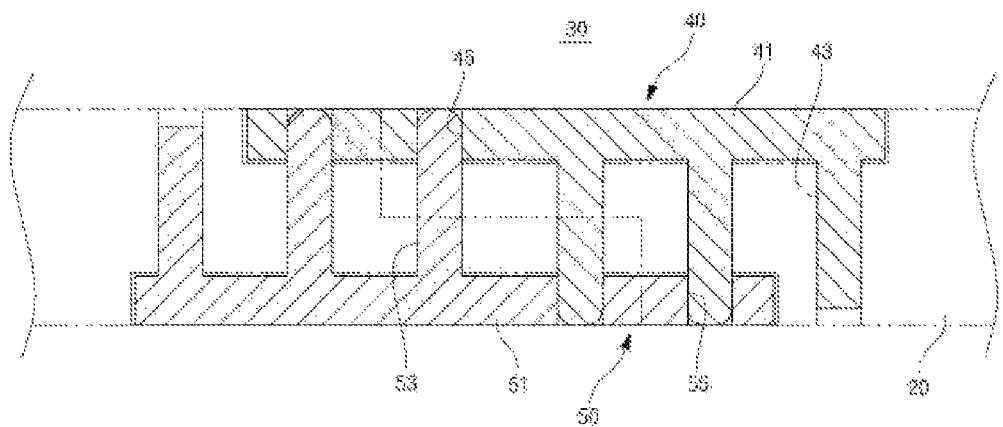
FIG. 7 is a cross-sectional view showing another embodiment of the fastening unit shown in FIG. 1.

Although the configuration in which each of the second fastening members 40 and 50 has 3 penetrating pins 43, 53 and corresponding 3 locking holes 45, 55 was illustrated in the first embodiment of the invention, this is disclosed for illustrative purposes and the numbers thereof can be changed. That is, as shown in FIG. 7, it is possible to connect the O-ring body 20 using a first fastening member 40' and a second fastening member 50', the first fastening member 40' having three first penetrating pins 43 and two first locking holes 45, and the second fastening member 50' having three second penetrating pins 53 and two second locking holes 55. In this case, the penetrating pins on the circumference are fitted into the coupling holes formed in the O-ring body 20, and serve to support the O-ring body 20, thereby preventing it from being deformed or warped.

Figure 8:
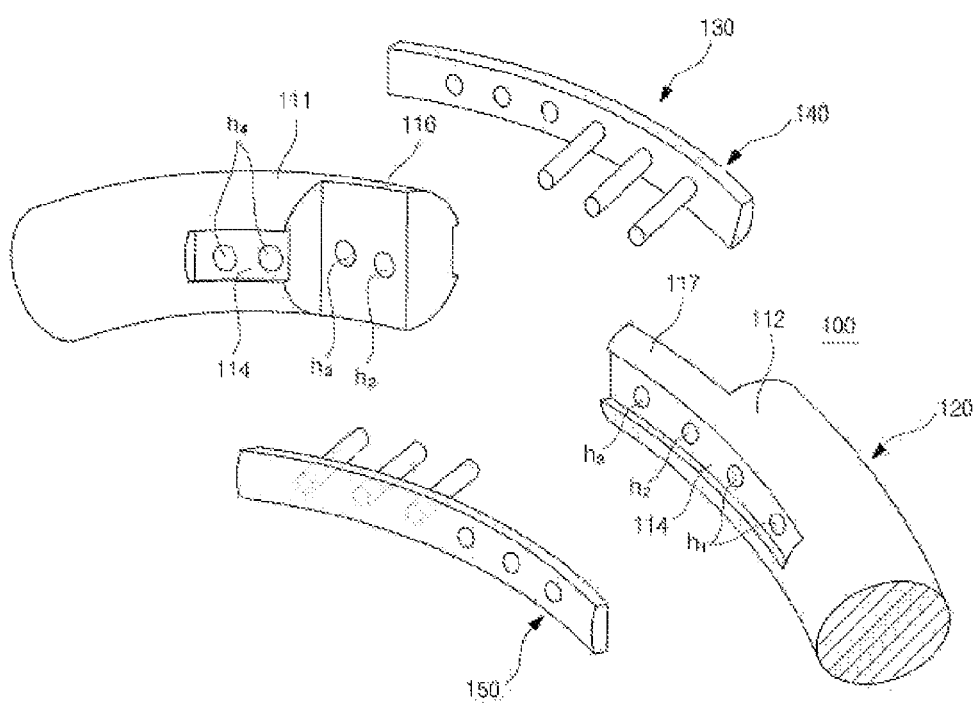
FIGS. 8 and 9 are views showing an O-ring for a feed roller according to a second embodiment of the invention.
Figure 9:
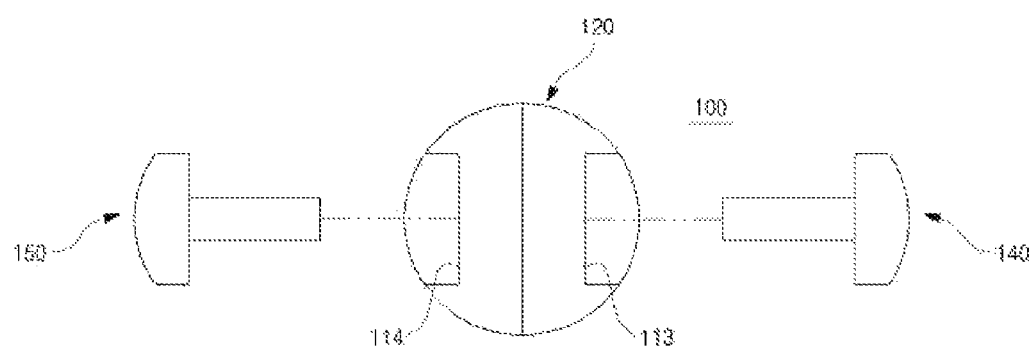
Figure 10:
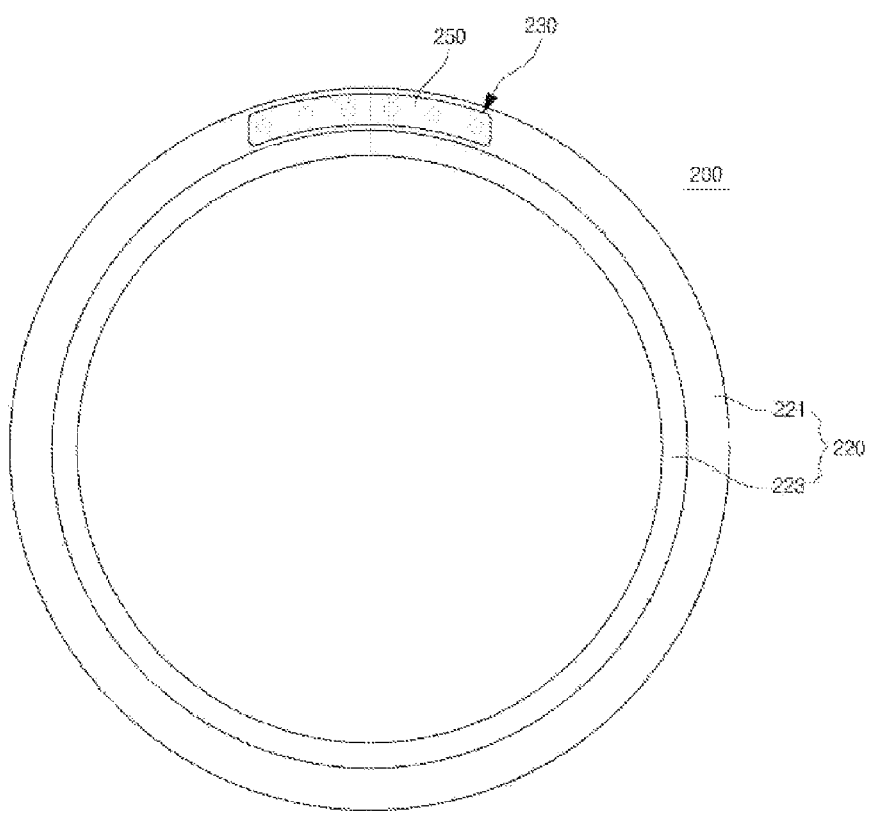
FIGS. 10 to 13 are views showing the O-ring for a feed roller of the invention shown in FIG. 8.
Figure 11:
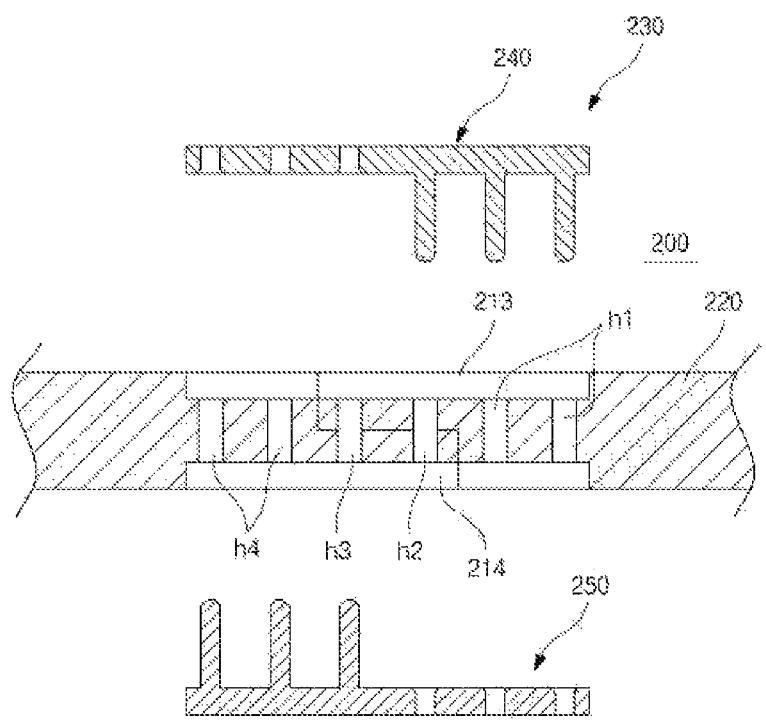
Figure 12:
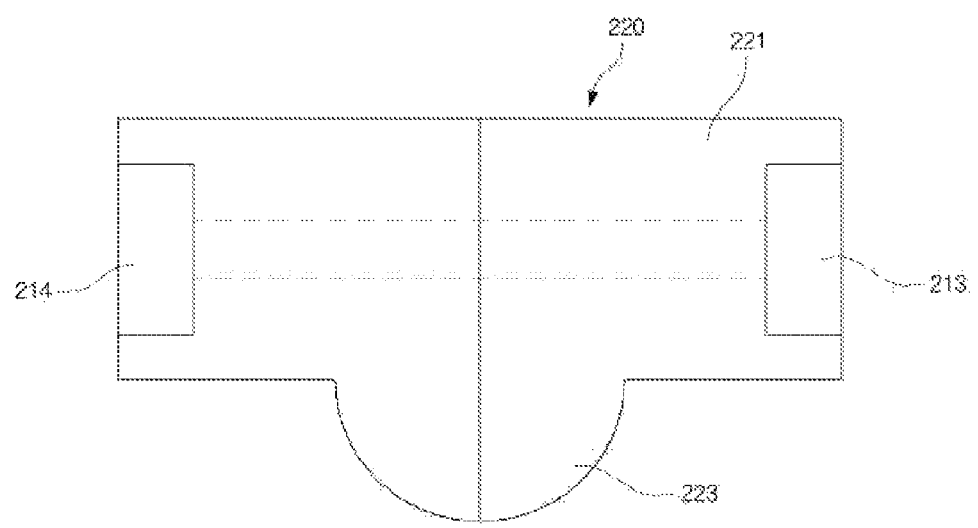
Figure 13:
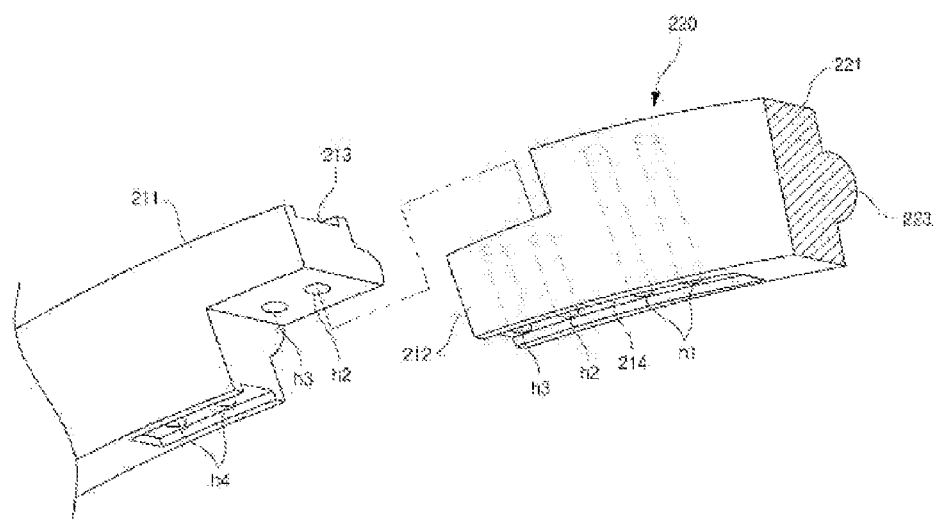
Figure 14:
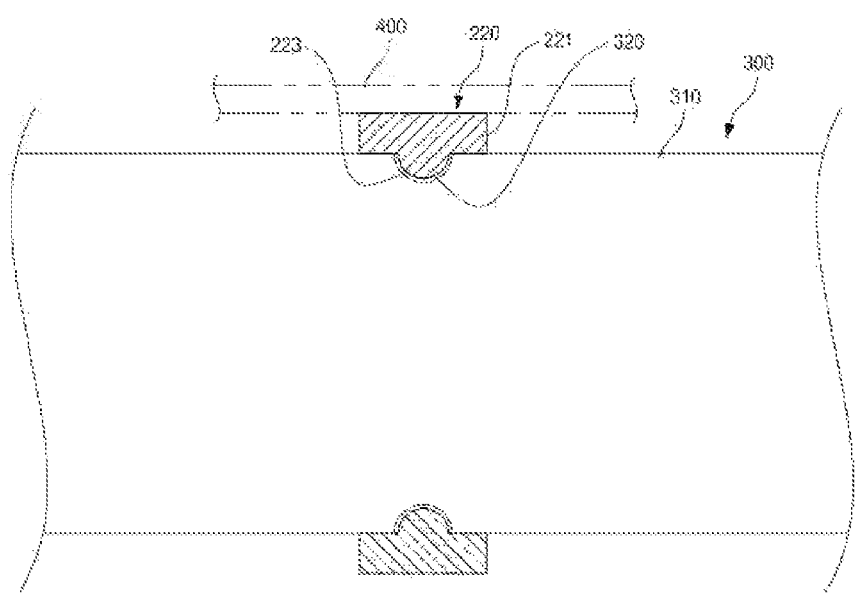
FIG. 14 is a view showing the state in which the O-ring for a feed roller shown in FIG. 8 is used in a feed roller.

In addition, referring to FIGS. 8 and 9, the O-ring 100 for a feed roller according to a second embodiment of the invention includes an O-ring body 120 having a circular cross-section and a fastening unit 130. The fastening unit 130 serves to fasten first and second ends 111 and 112 to each other, so that they are coupled and connected in a complementary fashion.

The first and second ends 111 and 112 of the O-ring body 120 are formed such that they are stepped like stairs so that the coupling surfaces thereof oppose each other in a complementary fashion. In addition, the O-ring body 120 has a pair of storage recesses therein. That is, first and second storage recesses 113 and 114 are engraved to a predetermined depth from the outer circumference of the O-ring body 120, such that they oppose each other. Each of the first and second storage recesses 113 and 114 is formed such that it spans between the first and second ends 111 and 112.

In addition, the first and second ends 111 and 112 of the O-ring body 120 have multiple coupling holes h1, h2, h3, and h4, which are spaced apart from each other at regular intervals. The coupling holes h2 and h3 formed in overlapping portions 116 and 117 are formed in opposing positions such that they communicate with each other.

The O-ring body 120 can be made of the same material as the O-ring body 20 described above, but differs in that it has a circular cross-section.

The fastening unit 130 includes first and second fastening members 140 and 150.

The first fastening member 140 includes a first body 141, a plurality of first penetrating pins 143, and a plurality of first locking holes 145. Here, the first body 141 is mounted by being received in the first storage recess 113, and has an arc-like outer surface such that it does not protrude beyond the outer circumference of the O-ring body 120 when it is mounted.

The second fastening member 150 also includes a second body 151, a plurality of second penetrating pins 153, and a plurality of locking holes 155. The first and second fastening members 140 and 150 having the above-described configuration are shaped to be symmetrical to each other, and are fastened to each other on both sides of the first and second ends 111 and 112 to oppose each other, such that the first and second penetrating pins 143 and 153 pass through the coupling holes h1, h2, h3, and h4 and are locked to the first and second locking holes 145 and 155 in corresponding positions. Consequently, the first and second ends 11 and 112 are coupled to each other. That is, the first and second fastening members 140 and 150 can be fastened to each other via the same operation as in the foregoing first and second fastening members 40 and 50.

In addition, referring to FIGS. 10 to 14, an O-ring 200 for a feed roller according to a third embodiment of the invention includes an O-ring body 220 having first and second ends 211 and 212 separated from each other, and a fastening unit 230 for connecting the separated first and second ends 211 and 212 of the O-ring body 220 to each other so that they can stay in the coupled state.

Here, the O-ring body 220 can be made of the same material as the O-ring bodies 20 and 120 described above, and the first and second ends 211 and 212, which serve as coupling components, are formed such that they are stepped like stairs.

In the meantime, the O-ring body 220 has a contact portion 221, which protrudes from the outer circumference 310 of a feed roller 300 when it is fastened to the feed roller 300, and a coupling portion 223 protruding inwards from the contact portion 221. The coupling portion 223 has an arc-like cross-section. The contact portion 221 can have a quadrangular cross-section, and the coupling portion 223 can have a semi-circular cross-section. In the case in which an O-ring fastening groove 320 formed in the feed roller 300 has an arc-like cross-section such that an O-ring having a circular cross-section can be fastened thereto, the coupling portion 223 has an arc-like cross-section so that it can be stably fitted into the O-ring fastening recess 320. Therefore, when an O-ring having a circular cross-section, which has been used so far, is replaced with a new one, it is possible to use the O-ring 200 according to the third embodiment of the invention. Accordingly, the O-ring of this embodiment of the invention can be mounted by replacing the existing one irrespective of the shape of the O-ring fastening recess 320 without need to replace the feed roller 300.

The O-ring body 220 has storage recesses 213 and 214 that are engraved into both side surfaces of the contact portion 221. Each of the storage recesses 213 and 214 is formed such that it spans between the first and second ends 211 and 212.

In addition, multiple coupling holes h1, h2, h3, and h4 are formed at regular intervals such that they penetrate from one side of the contact portion 221 to the other side. The coupling holes h2 and h3 are formed in opposing positions of the first and second ends 211 and 212.

The fastening unit 230 includes first and second fastening members 240 and 250. The first and second fastening members 240 and 250 are symmetrical to each other, and their configurations are the same as those of the fastening members 40 and 50, which were described above with reference to FIGS. 1 to 5. Therefore, the first and second fastening members 240 and 250 are coupled to each other in a complementary fashion on both sides of the contact portion 221 of the O-ring body 220, in the same fashion as in the fastening members 40 and 50. Consequently, the first and second ends 211 and 212 are fastened to each other such that they cannot be separated from each other.

In the meantime, in the views shown in FIGS. 1 to 14, it should be understood that the interval between the coupling surfaces of the ends in the state in which the O-ring body is coupled is intentionally exaggerated. However, in actual products, substantially no interval or a very minute interval, if any, is formed, thereby there is substantially no adverse effect on the function of the O-ring itself.

While the invention has been illustrated and described above in connection with the certain potentially exemplary embodiments, it is to be appreciated that the present invention is by no means limited to the structures and functions as illustrated and described above. On the contrary, it is to be understood that those skilled in the art can make various modifications and variations to the present invention without departing from the spirit and scope of the appended claims.

(Description Of Reference Numerals)
10, 100, 200: O-ring for a feed roller
20, 120, 220: O-ring body
30, 130, 230: fastening unit
40, 40', 140, 240: first fastening member
50, 50', 150, 250: second fastening member
300: feed roller 400: substrate Industrial Applicability According to the O-ring for a feed roller of the present invention, the O-ring can be mounted on the feed roller by connecting and coupling the discontinuing portions of the O-ring body to each other using the fastening unit.

Consequently, it is possible to easily replace an existing O-ring with a new one by mounting it on the substrate feed roller such that it surrounds the outer circumference of the feed roller without disassembling the components or devices, which are coupled to one part of the substrate feed roller.

This, consequently, can reduce the time required to replace the O-ring, and simplify the replacing operation, thereby reducing costs. In addition, this can minimize the time for which plant operations must be stopped so that the replacement operation can be carried out, thereby increasing the productivity of making products.

Furthermore, since it is not necessary to disassemble the various components and devices, which are coupled to the feed roller, the assembly error that would otherwise occur during reassembly subsequent to disassembly, can be ultimately excluded. Accordingly, there are advantages in that the setting operation related to the reassembly operation is not necessary, and in that it is possible to prevent a malfunction or a decrease in productivity, which the assembly error otherwise would cause.

The invention claimed is:

1. An O-ring for a feed roller comprising:
an O-ring body having first and second ends, which are discontinued from each other, wherein coupling surfaces in the first and second ends are capable of being coupled to each other while opposing each other in a complementary fashion; and
a fastening unit fastening the first and second ends to each other such that the coupling surfaces in the first and second ends form and maintain an overlapped and a coupled state in which coupling surfaces oppose each other in a complementary fashion,
wherein the first and second ends of the O-ring body have first and second storage recesses formed in corresponding opposite positions, the first and second storage recesses being engraved on outer circumferential surfaces thereof, and the fastening unit is received in and fitted to the first and second storage recesses,
wherein the O-ring body has a plurality of coupling holes in the first and second ends thereof, the coupling holes penetrating portions of the first and second ends that correspond to the first and second storage recesses, and
wherein the fastening unit includes first and second fastening members, wherein each of the first and second fastening members is fitted by being received in a corresponding one of the first and second storage recesses, and the first and second fastening members pass through the coupling holes and are locked to each other in a complementary fashion,
wherein the first fastening member includes:
a first body received in and fitted to the first storage recess, wherein the first body has a plurality of first locking holes formed in positions corresponding to a portion of the coupling holes; and
a plurality of first penetrating pins protruding from the first body, wherein the first penetrating pins pass through a remaining portion of the coupling holes and protrude to an opposite side,
wherein the second fastening member includes:
a second body received in and fitted to the second storage recess, wherein the second body has plurality of second locking holes to which at least one of the first penetrating pins is locked; and
a plurality of second penetrating pins protruding from the second body, wherein at least one of the second penetrating pins passes through the coupling holes and is locked to the first locking holes formed in the first body.

2. The O-ring for a feed roller of claim 1, wherein the coupling holes comprise six coupling holes formed at regular intervals, at least two of the coupling holes being formed in overlapping portions of the first and second ends.

3. The O-ring for a feed roller of any one of claims 1 to 2, wherein the O-ring body has a quadrangular cross-section, and wherein the coupling surfaces of the first and second ends, which are coupled to each other in a complementary fashion, are stepped like stairs on an outer circumference and are linearly formed on a side surface.

4. The O-ring for a feed roller of any one of claims 1 to 2, wherein the O-ring body has a circular cross-section, and wherein the first and second fastening members are coupled to each other on both sides of the first and second ends in a state in which each of the first and second fastening members is received in a corresponding one of the first and second storage recesses, and have an arc-like outer surface corresponding to an outer circumference of the O-ring body having a circular cross-section.

5. The O-ring for a feed roller of any one of claims 1 to 2, wherein the O-ring body includes:

a contact portion having a quadrangular cross-section, wherein the contact portion protrudes outwards and comes into contact with a substrate to be carried when the O-ring is fitted to the feed roller; and a coupling portion protruding from an inner circumference of the contact portion in a circumferential direction, wherein the coupling portion has an arc-like cross-section, and is fitted to an O-ring fastening recess of the feed roller, which is engraved in a shape of an arc, when the O-ring is fitted to the feed roller, wherein the first and second storage recesses are formed in both outer surfaces of the contact such that both the first and second storage recesses correspond to each other, and wherein the fastening unit is coupled to the contact portion by being fitted to the first and second storage recesses.

* * * * *